United States Patent

[11] 3,617,094

[72] Inventor Harold O. Kester
   Loveland, Colo.
[21] Appl. No. 18,581
[22] Filed Mar. 11, 1970
[45] Patented Nov. 2, 1971
[73] Assignee The Eagle Construction Corporation
   Loveland, Colo.

[54] METHOD AND APPARATUS FOR HANDLING MATERIAL
1 Claim, 9 Drawing Figs.

[52] U.S. Cl. .................................................. 302/14
[51] Int. Cl. .................................................. B65g 53/30
[50] Field of Search .................................... 302/14, 15, 16; 137/411, 409

[56] References Cited
UNITED STATES PATENTS

| | | | |
|---|---|---|---|
| 2,159,352 | 5/1939 | Chapman ...................... | 302/14 |
| 2,793,082 | 5/1957 | Gardner, Jr. .................. | 302/14 |
| 2,835,536 | 5/1958 | Christille ...................... | 302/14 |

Primary Examiner—Evon C. Blunk
Assistant Examiner—H. S. Lane
Attorney—Edward Hoopes, III ABSTRACT: A method of handling solid-containing fluid comprising introducing solid-containing fluid into a chamber, also introducing into the chamber liquid which admixes with and becomes part of the solid-containing fluid, pumping out the solid-containing fluid at substantially constant rate through an outlet at the lower portion of the chamber and controlling the quantity of said liquid introduced into the chamber so that the level of fluid in the chamber is maintained above the outlet despite fluctuation in the rate of introduction of solid-containing fluid into the chamber. Preferably the quantity of said liquid introduced into the chamber is controlled so that the level of fluid in the chamber is maintained substantially constant despite fluctuation in the rate of introduction of solid-containing fluid into the chamber. Also a method of handling material comprising delivering solid material such as material mined from the earth into a container and there admixing it with liquid, by hydraulic injection introducing the admixture of solid material and liquid into a chamber as solid-containing fluid and handling the solid-containing fluid as just described.

Further, apparatus for handling solid-containing fluid comprising a chamber having an outlet at its lower portion, means for introducing solid-containing fluid into the chamber, means for also introducing into the chamber liquid which admixes with and becomes part of the solid-containing fluid, pump means for pumping out the solid-containing fluid at substantially constant rate through the outlet at the lower portion of the chamber and means for controlling the quantity of said liquid introduced into the chamber so that the level of fluid in the chamber is maintained above the outlet despite fluctuation in the rate of introduction of solid-containing fluid into the chamber. Preferably the last-mentioned means are constructed and arranged to control the quantity of said liquid introduced into the chamber so that the level of fluid in the chamber is maintained substantially constant despite fluctuation in the rate of introduction of solid-containing fluid into the chamber. The last-mentioned means may comprise float-controlled valve means, preferably two float-controlled valves with the floats at different elevations.

Also, apparatus for handling material comprising a container, means for delivering solid material such as material mined from the earth into the container for admixture with the solid material, a chamber having an outlet at its lower portion, hydraulic injection means introducing the admixture of solid material and liquid into the chamber as solid-containing fluid, means for also introducing into the chamber liquid which admixes with and becomes part of the solid-containing fluid, pump means for pumping out the solid-containing fluid at substantially constant rate through the outlet at the lower portion of the chamber and means for controlling the quantity of said liquid introduced into the chamber so that the level of fluid in the chamber is maintained above the outlet despite fluctuation in the rate of introduction of solid-containing fluid into the chamber.

PATENTED NOV 2 1971 3,617,094

HAROLD O. KESTER
INVENTOR.

BY

Edward Hooper III
his attorney

HAROLD O. KESTER
INVENTOR.

BY

Edward Hooper III
his attorney

PATENTED NOV 2 1971 3,617,094

HAROLD O. KESTER
INVENTOR.

BY

Edward Hooper III
his attorney

METHOD AND APPARATUS FOR HANDLING MATERIAL

The present invention relates to a method of and apparatus for handling material. It relates more particularly to the handling of solid material such as material mined from the earth and the handling of solid-containing fluid, especially fluid containing solid material such as material mined from the earth.

While my invention has wide application, I have found it to have particular utility in the removal and disposal of solid material mined from the earth, and in the following description I shall use the term "earth" generically to comprehend such material, whatever its specific character. Also I use the term "mined" generically to comprehend removal of earth by whatever means.

For purposes of explanation and illustration I shall describe my invention as employed in the removal and disposal of earth in a tunneling operation as in the digging of a tunnel through a mountain, but it is to be distinctly understood that this is but one application of my invention and that the invention may be otherwise variously employed.

IN a tunneling operation the earth must be dislodged and then removed and disposed of. Highly sophisticated apparatus has been devised for dislodging the earth but the removal and disposal of the dislodged earth has posed a problem which has defied satisfactory solution. Many proposals have been made to remove and dispose of earth in the dry state mechanically or pneumatically, or to flow it out hydraulically. Hydraulic removal offers the most promise economically, but the efforts which have been made in hydraulic removal of earth in tunneling and related operations have not been fully satisfactory from the standpoints of reliability and efficiency. A particular problem has been the reliable and efficient operation of hydraulic earth removal means when the rate at which the dislodging means makes the earth available to the removal means fluctuates as may occur when the boring head is periodically advanced to the working face or when the conveyor immediately behind the boring head is repositioned.

I have solved the problem by the provision of a method of and apparatus for hydraulically removing earth which function continuously and efficiently despite fluctuation in the rate at which earth is made available by the dislodging means or boring head.

In one aspect of my invention I provide a method of handling solid-containing fluid comprising introducing solid-containing fluid into a chamber, also introducing into the chamber liquid which admixes with and becomes part of the solid-containing fluid, pumping out the solid-containing fluid at substantially constant rate through an outlet at the lower portion of the chamber and controlling the quantity of said liquid introduced into the chamber so that the level of fluid in the chamber is maintained above the outlet despite fluctuation in the rate of introduction of solid-containing fluid into the chamber. Preferably the quantity of said liquid introduced into the chamber is controlled so that the level of fluid in the chamber is maintained substantially constant despite fluctuation in the rate of introduction of solid-containing fluid into the chamber. I also provide a method of handling material comprising delivering solid material such as material mined from the earth into a container and there admixing it with liquid, by hydraulic injection introducing the admixture of solid material and liquid into a chamber as solid-containing fluid and handling the solid-containing fluid as just described.

In another aspect of my invention I provide apparatus for handling solid-containing fluid comprising a chamber having an outlet at its lower portion, means for introducing solid-containing fluid into the chamber, means for also introducing into the chamber liquid which admixes with and becomes part of the solid-containing fluid, pump means for pumping out the solid-containing fluid at substantially constant rate through the outlet at the lower portion of the chamber and means for controlling the quantity of said liquid introduced into the chamber so that the level of fluid in the chamber is maintained above the outlet despite fluctuation in the rate of introduction of solid-containing fluid into the chamber. Preferably the last-mentioned means are constructed and arranged to control the quantity of said liquid introduced into the chamber so that the level of fluid in the chamber is maintained substantially constant despite fluctuation in the rate of introduction of solid-containing fluid into the chamber. The last-mentioned means may comprise float-controlled valve means, preferably two float-controlled valves with the floats at different elevations.

I also provide apparatus for handling material comprising a container, means for delivering solid material such as material mined from the earth into the container, means for delivering liquid into the container for admixture with the solid material, a chamber having an outlet at its lower portion, hydraulic injection means introducing the admixture of solid material and liquid into the chamber as solid-containing fluid, means for also introducing into the chamber liquid which admixes with and becomes part of the solid-containing fluid, pump means for pumping out the solid-containing fluid at substantially constant rate through the outlet at the lower portion of the chamber and means for controlling the quantity of said liquid introduced into the chamber so that the level of fluid in the chamber is maintained above the outlet despite fluctuation in the rate of introduction of solid-containing fluid into the chamber.

Other details, objects and advantages of the invention will become apparent as the following description of a present preferred embodiment thereof and a present preferred method of practicing the same proceeds.

In the accompanying drawings I have shown a present preferred embodiment of the invention and have illustrated a present preferred method of practicing the same in which.

The drawings are largely diagrammatic since the elements of the apparatus are for the most part conventional elements available in the open market. However, I combine and utilize such elements in a novel way whereby I accomplish my new and useful results.

Figure 1:
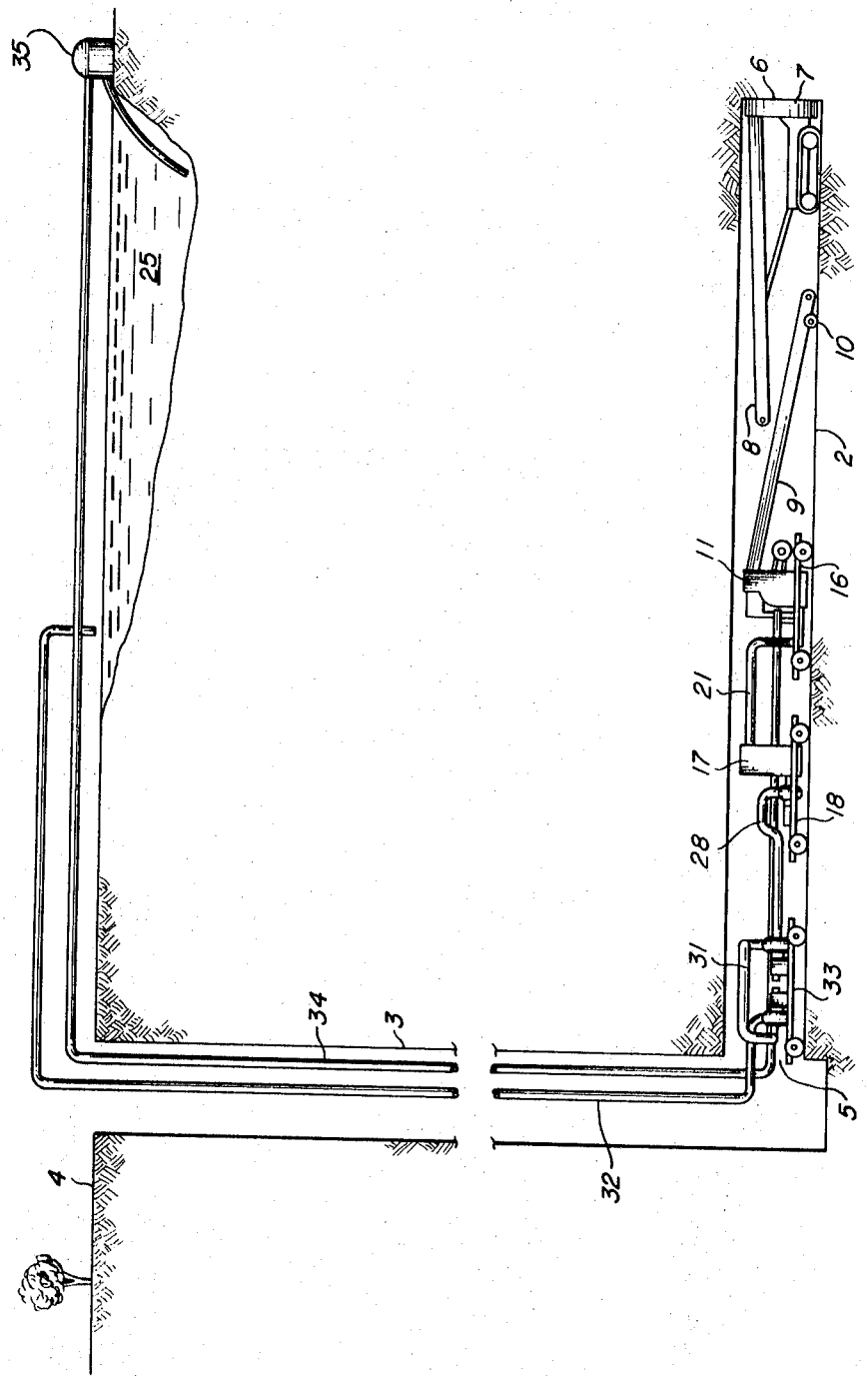
FIG. 1 is a schematic elevational view of my apparatus for handling material as used in a tunnelling operation, with portions broken away.
Figure 2:
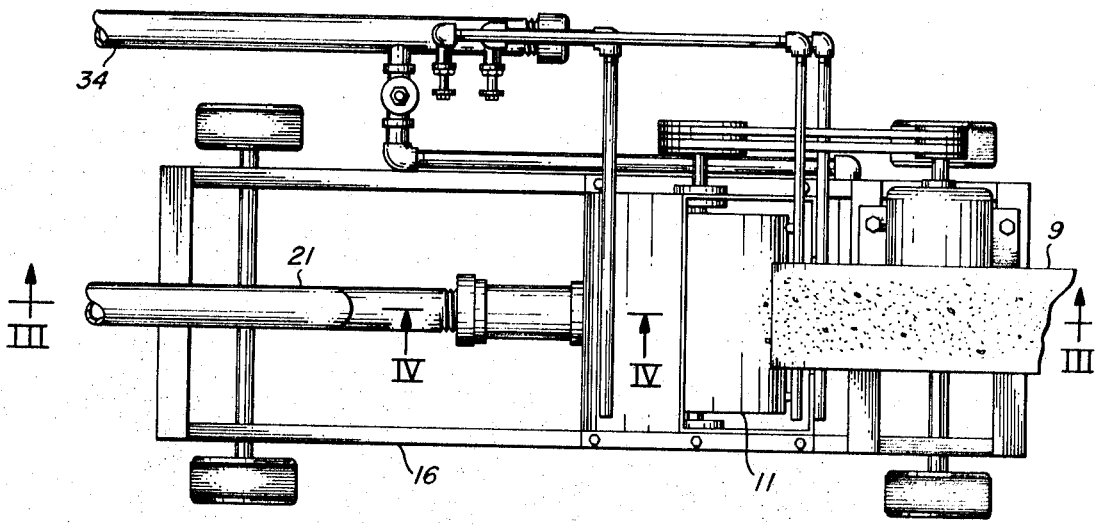
FIG. 2 is a plan view of a first section of the apparatus, including the crusher.
Figure 3:
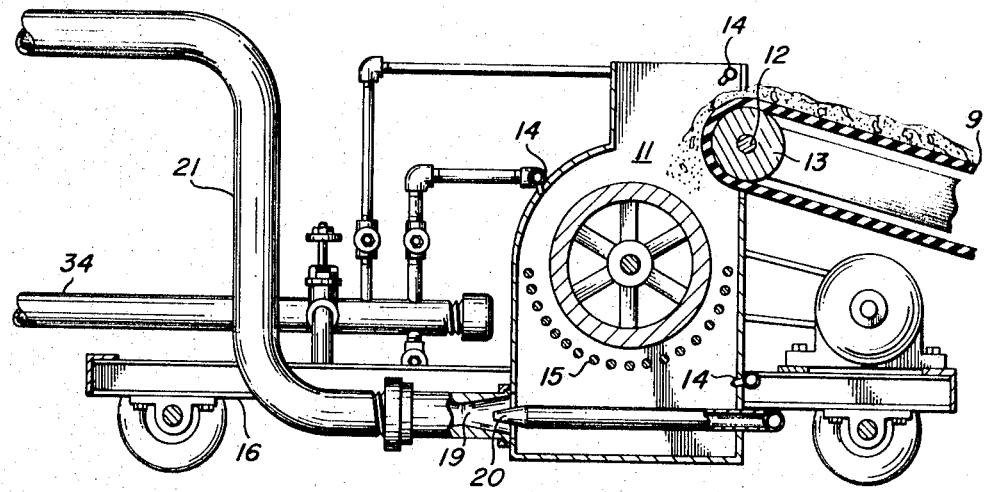
FIG. 3 is a vertical cross-sectional view of the first section of the apparatus, taken on the plane III—III OF FIG. 2.
Figure 4:
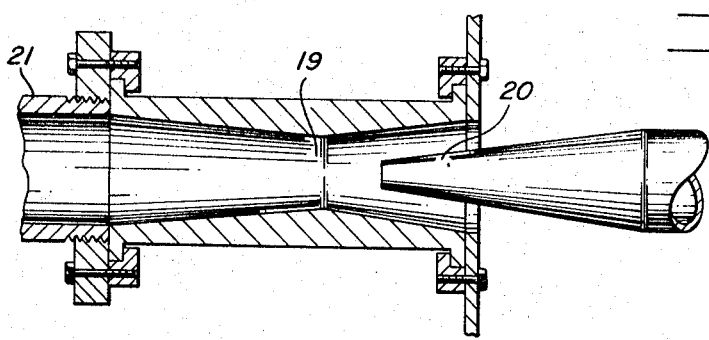
FIG. 4 is an enlarged fragmentary detail vertical cross-sectional view of hydraulic injection means forming part of the first section of the apparatus, taken on the plane IV—IV of FIG. 2.
Figure 5:
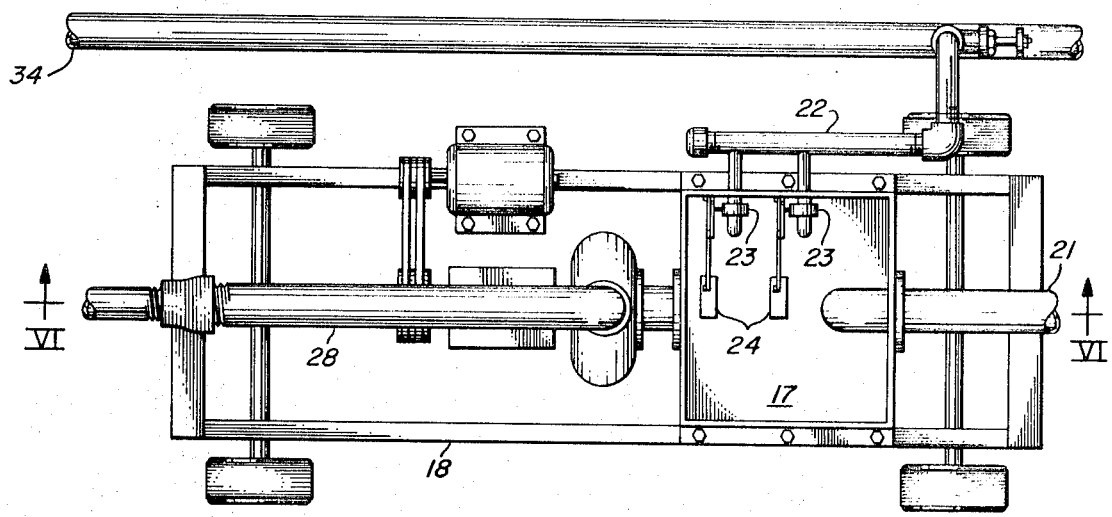
FIG. 5 is a plan view of a second section of the apparatus, including the balancing tank.
Figure 6:
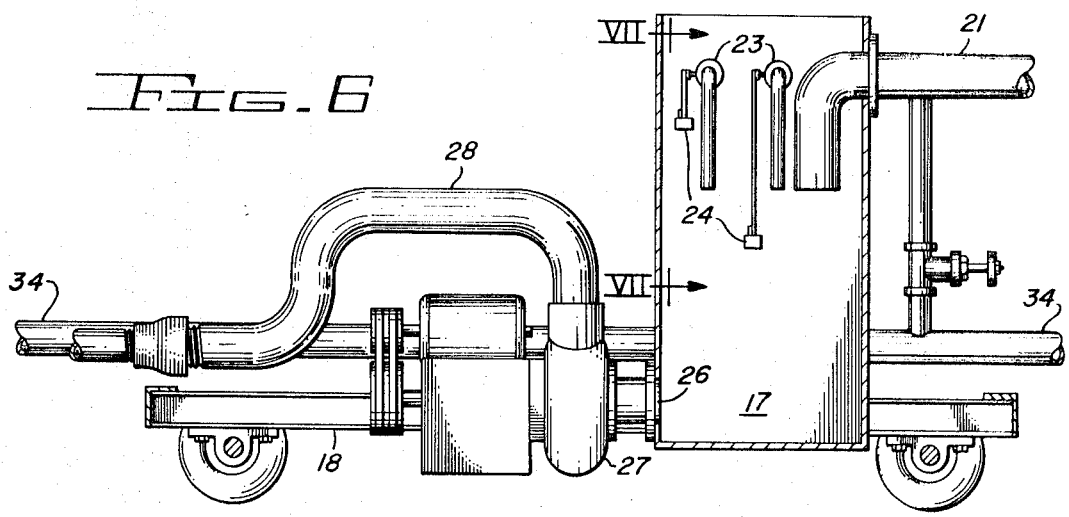
FIG. 6 is a vertical cross-sectional view of the second section of the apparatus, taken on the plane VI—VI OF FIG. 5.

I have designated by reference numeral 2 a generally horizontal tunnel being bored in the earth. The direction of boring is from left to right viewing FIG. 1. A vertical shaft 3 extends downwardly from the surface 4 to the tunnel mouth 5. The working face is shown at 6 and the earth dislodging means or boring head is illustrated diagrammatically at 7. This may take any one of a large variety of forms; I have utilized with success a Calweld 10'-5" diameter tunnel-boring machine. The earth is conveyed from the boring head by a conveyor 8 which deposits in on a second conveyor 9. The conveyors 8 and 9 may be of any conventional type, endless-belt conveyors being found satisfactory for the purpose. The conveyor arrangement shown allows the boring machine and conveyor 8, which may derive its power from the boring machine, to advance a considerable distance independently of the conveyor 9 and the apparatus therebehind presently to be described, which apparatus must of course be advanced and the supply lines lengthened periodically as the boring of the tunnel progresses. The forward end of the conveyor 9 may be carried by wheels 10.

The conveyor 9 deposits the earth into a crusher shown purely diagrammatically and designated generally by reference numeral 11. The purpose of the crusher is to crush or disintegrate the earth so that it may be hydraulically conveyed. I have used with success a 32-30 Hewitt-Robins hammer mill crusher driven by a 100 horsepower electric motor. The conveyor 9 may derive its power from the crusher through a shaft 12 carrying a pulley 13 at the delivery end of the conveyor. The earth is not only crushed but is also submerged in water in the crusher 11. Water is introduced into the crusher through nozzles 14. The crushed earth after passing through the openings in a grate 15 and submerged in water is collected in the bottom of the crusher 11. The crusher 11 with its ancillary mechanism is carried by a car 16; this is the first section of my apparatus.

The earth is hydraulically conveyed from the crusher 11 to a chamber designated generally by reference numeral 17 which I call a balancing tank and which with its ancillary mechanism is carried by a car 18; this is the second section of my apparatus. The delivery of the earth from the crusher 11 into the balancing tank 17 is effected through a venturi 19 into which a high-speed water jet 20 discharges so that the earth is delivered from the crusher and introduced into the balancing tank by hydraulic injection. A pipe 21 leads from the venturi 19 to the upper portion of the balancing tank 17. Thus solid-containing fluid is introduced into the balancing tank. Additional water is also introduced into the balancing tank through a pipe 22 leading to valves 23 controlled by floats 24. The water introduced through the pipe 22 is supplied from a surface pond 25 which also supplies the water for the nozzles 14 and 20.

The balancing tank 17 has in its lower portion an outlet 26 through which the solid-containing fluid, which by this time also includes the water introduced through the valves 23, is delivered to a pump 27. The floats 24 control the valves 23 so that water is delivered to the balancing tank 17 through the pipe 22 in such quantity that the level of fluid in the balancing tank is maintained above the outlet 26, insuring against the introduction of air into the system, despite fluctuation in the rate of supply of earth from the boring head which of course controls the supply of solid-containing fluid introduced through the venturi 19 into the balancing tank 17. I prefer to construct and arrange the floats 24 and valves 23 controlled thereby so that the level of fluid in the balancing tank is maintained substantially constant despite fluctuation in the rate of introduction of solid-containing fluid into the balancing tank. This insures continuous operation with a constant volume discharge through the outlet 26 without danger of introducing air into the system.

Figure 7:
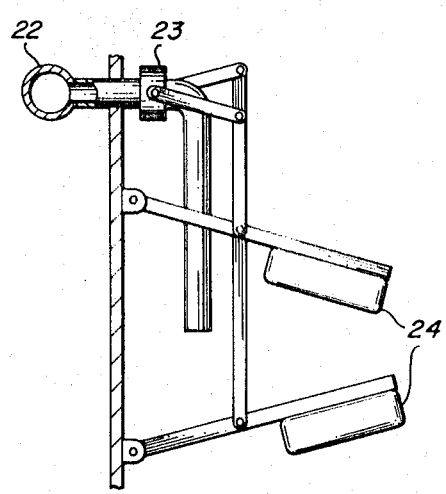
FIG. 7 is an enlarged fragmentary detail view of float-controlled valve mechanism forming part of the second section of the apparatus, the valve controlled by the upper float being in open position and the valve controlled by the lower float being in closed position, the view being taken on the plane VII—VII of FIG. 6.
Figure 8:
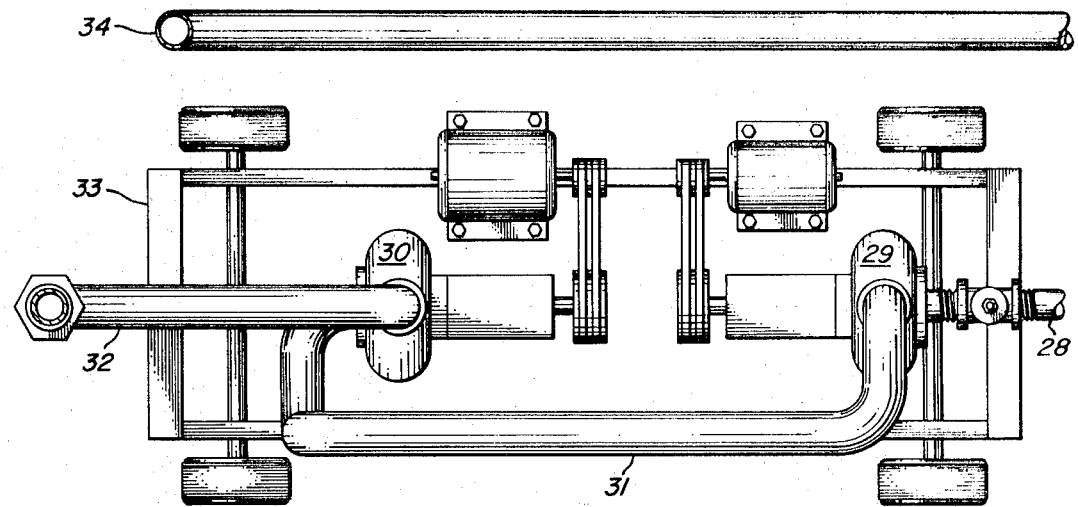
FIG. 8 is a plan view of a third section of the apparatus, including pumps and piping.
Figure 9:
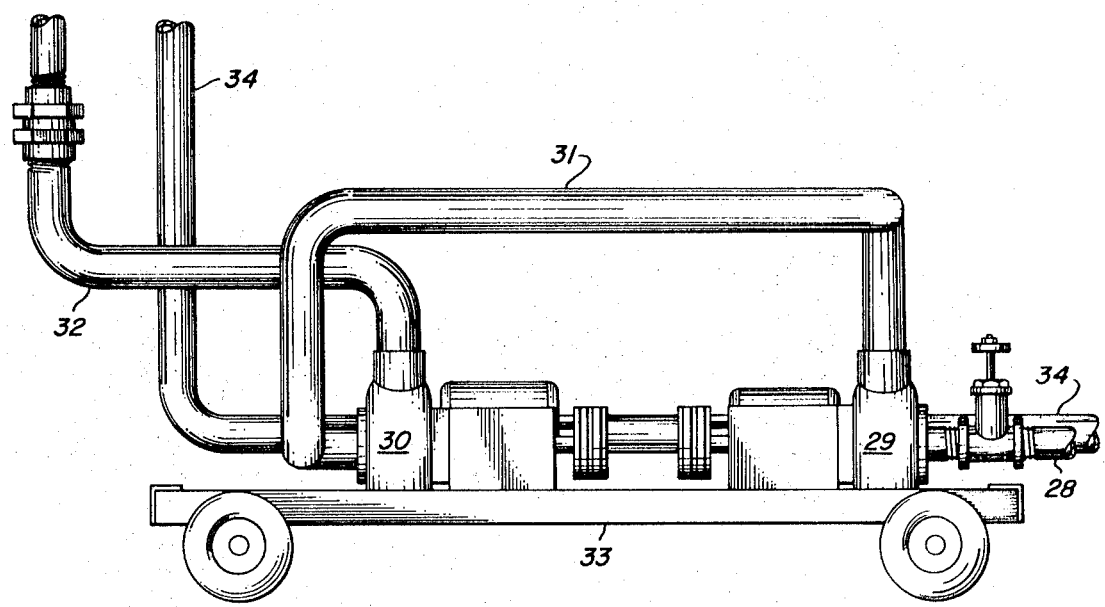
FIG. 9 is an elevational view of the third section of the apparatus.

The two valves 23 controlling admission of water from the pipe 22 into the balancing tank 17 are shown as being at the same level although the relative level of the valves is not important. However, although it would be possible to employ but a single float controlling both valves, I prefer to employ two floats at different elevations one of which controls one valve and the other of which controls the other valve through linkages as shown in FIG. 7. I find that in normal operation when solid-containing fluid is being delivered through the pipe 21 into the balancing tank 17 the valve controlled by the lower float is closed most of the time or fluctuates between open and closed position while the valve controlled by the upper float remains open, but when the flow of solid-containing fluid into the balancing tank is interrupted the level in the balancing tank tends to fall and both valves open, admitting a relatively large quantity of water maintaining the level in the balancing tank substantially constant and well above the outlet 26.

The pump 27 delivers the solid-containing fluid through a pipe 28 to pumps 29 and 30 in series or tandum through a pipe 31, the solid-containing fluid being discharged upwardly to the surface pond 25 through a pipe 32. The pumps 29 and 30 and their ancillary mechanism are carried by a car 33; this is the third section of my apparatus. The downward supply of water from the surface pond is through a pipe 34 with connections as shown to the nozzles 14 and 20 and the pipe 22.

As above indicated, the elements may be conventional elements available in the open market. I have used with success a venturi 19 having a throat diameter of about 4 inches and about 18 inches long. The nozzle 20 used therewith has had a 1 inch discharge orifice and the water delivered thereto has been under a pressure of about 150 pounds per square inch. The water is supplied from the surface pond 25 through a 100 horsepower deep well turbine-type pump 35. The pumps 27, 29 and 30 which I have employed are Allen-Sherman-Hoff 6 inch material-handling pumps While I have shown and described a present preferred embodiment of the invention and have illustrated a present preferred method practicing the same, it is to be distinctly understood that the invention is not limited thereto but may be otherwise variously embodied and practiced within the scope of the following claims.

I claim:

1. Apparatus for handling solid-containing fluid comprising a chamber having an outlet at its lower portion, means for introducing solid-containing fluid into the chamber, means for also introducing into the chamber liquid which admixes with and becomes part of the solid-containing fluid, pump means for pumping out the solid-containing fluid at substantially constant rate through the outlet at the lower portion of the chamber and means for controlling the quantity of said liquid introduced into the chamber so that the level of fluid in the chamber is maintained above the outlet despite fluctuation in the rate of introduction of solid-containing fluid into the chamber, the last-mentioned means comprising two float-controlled valves with the floats at different elevations.

* * * * *

UNITED STATES PATENT OFFICE
CERTIFICATE OF CORRECTION

Patent No. 3,617,094　　　　　　　　　　Dated November 2, 1971

Inventor(s) Harold O. Kester

It is certified that error appears in the above-identified patent and that said Letters Patent are hereby corrected as shown below:

On the title page, second column, line 29, after "container" insert --, means for delivering liquid into the container--. Column 1, line 21, change "IN" to --In--. Column 2, line 46, change "OF" to --of--.

Signed and sealed this 18th day of April 1972.

(SEAL)
Attest:

EDWARD M. FLETCHER, JR.　　　　ROBERT GOTTSCHALK
Attesting Officer　　　　　　　　Commissioner of Patents